United States Patent [19]

Aimi

[11] 4,121,063

[45] Oct. 17, 1978

[54] POWER TRANSMISSION FLAT CABLE FOR REMOTE-CONTROLLED ELECTRICAL APPARATUS

[75] Inventor: Mitsuo Aimi, Kadoma, Japan

[73] Assignee: Matsushita Electric Industrial Co., Limited, Japan

[21] Appl. No.: 663,060

[22] Filed: Mar. 2, 1976

[30] Foreign Application Priority Data

Jun. 3, 1975 [JP] Japan .............................. 50-75708[U]
Jun. 25, 1975 [JP] Japan .............................. 50-90146[U]

[51] Int. Cl.² ................................................ H01H 3/00
[52] U.S. Cl. ..................................................... 200/18
[58] Field of Search .................................. 200/16–18, 200/153 R, 153 L–153 LB, 153 P, 158, 161, 330, 337; 74/501 R

[56] References Cited

U.S. PATENT DOCUMENTS

| | | | |
|---|---|---|---|
| 2,868,967 | 1/1959 | Poppa et al. .................. | 200/18 X |
| 2,959,658 | 11/1960 | Parker .......................... | 200/153 P X |
| 3,435,165 | 3/1969 | Lombard ....................... | 200/161 X |
| 3,479,903 | 11/1969 | Hermanson et al. ........... | 200/16 R |
| 3,639,706 | 2/1972 | Purdy .......................... | 200/153 P X |
| 3,651,293 | 3/1972 | Hoffman ....................... | 200/153 P |
| 3,912,896 | 10/1975 | Imamura ....................... | 200/337 |

FOREIGN PATENT DOCUMENTS 1,161,434  8/1969  United Kingdom ................... 200/158

*Primary Examiner*—James R. Scott
*Attorney, Agent, or Firm*—Robert E. Burns; Emmanuel J. Lobato; Bruce L. Adams

[57] ABSTRACT

A remote controlled electrical circuit apparatus having a master control device, a slave electrical circuit device capable of providing variable electrical circuit parameters in response to a force applied thereto, a force-transmitting mechanism including a transmitting thin strip member, longitudinally spaced transverse sections overlying different sides of the transmitting member and a pair of thin strip guide members rigidly connected to the transverse sections. The transmitting and guide members both have the same thickness and are disposed on the same plane to permit them to have a same radius of curvature when subject to bending. A connector at each end of the force-transmitting mechanism connects a respective end of the mechanism to one of the master and slave devices.

7 Claims, 19 Drawing Figures

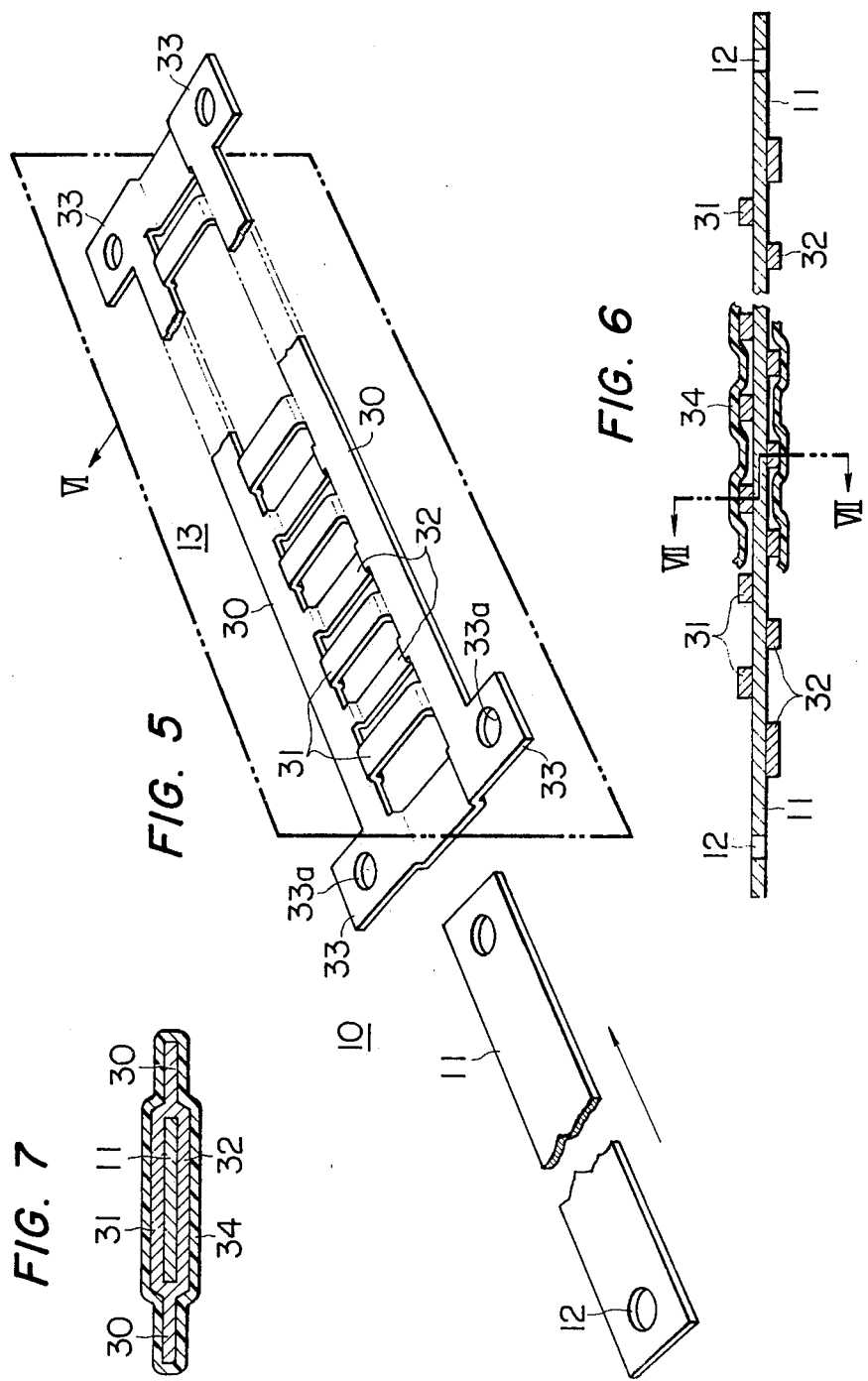

POWER TRANSMISSION FLAT CABLE FOR REMOTE-CONTROLLED ELECTRICAL APPARATUS

BACKGROUND OF THE INVENTION

The present invention relates generally to remote control apparatus, and in particular to a remote-controlled electrical circuit apparatus useful for assemblage and installation of electrical circuit components.

The labor involved in making an assembly of electrical circuits is considerable and this can be reduced by installing mechanically adjustable electrical circuit devices such as variable resistors, variable capacitors and switching circuits at a place convenient for mounting and locating the control part of the system in an accessible place. The control part, or master control device and the mechanically controlled circuit device, or slave device may be connected by means of a well known Bowden cable. This cable comprises an inner wire made of spring steel enclosed in an outer helical casing and is used to transmit longitudinal motions over distances. This prior art cable is particularly useful for heavy duty applications which permits a considerable degree of tolerance in precision. However, because of its cylindrical structure the far end of the inner member will not follow the movement of the near end with respect to the outer member when the cable is subjected to bending. This difference in movement between the opposite ends of the inner member with respect to the outer member makes the prior art cable unsuitable for applications where high precision is required.

SUMMARY OF THE INVENTION

The primary object of the present invention is therefore to provide remote-controlled electrical circuit apparatus which is capable of accurately transmitting force from a master to a slave device.

Another object of the invention is to provide remote-controlled electrical circuit apparatus which is particularly advantageous for assemblage and installation of electrical circuit components.

According to this invention, there is provided a force transmitting mechanism which comprises an inner thin flexible strip force-transmitting elongated member, and an outer flexible guide sheath shorter than the inner member and having a pair of longitudinally extending side members parallel to opposite edges of the force-transmitting member, and longitudinally spaced transverse sections which overlie opposite side surfaces of the transmitting member and connected to the pair of side members. One of the opposed side members of the sheath that forms part of the central portion is spaced from the other side member by the thickness of the inner member to slidably accommodate the same and has a series of longitudinally spaced rectangular apertures.

—The force transmitting member and the side members have an equal thickness and are disposed on the same plane so that they tend to have the same radius of curvature when they take the shape of an arch. With this construction, the same amount of stroke can be transmitted from a master to a slave device no matter what shape the transmitting mechanism may take. This permits the master and slave devices to be located at any desired places while retaining the accuracy of force transmission.

A connector is provided for each end of the force-transmitting mechanism, which includes a block formed with a guide slot in which a guide follower is slidably disposed and connected with a respective end of the transmitting member of the mechanism. The block is connected with a respective end of the guide members of the mechanism. The connector is formed with a means for permitting the same to be attached to the master or slave device so that the guide follower may engage the operating member of such a device. This construction permits the master and slave devices to be installed first in appropriate locations and then operatively connected together by means of the transmitting mechanism with the connector at each end. Preferably, the connector comprises a parallelpiped block of moulded plastic having a guide slot extending along its length and penetrating its transverse dimension and connected to one end of the outer member, and a T-shaped guide follower wherein the leg of the T is connected to one end of the inner member, a first arm of the T extends through the transverse dimension of the block to engage the operating member of one of the master and slave devices, and a second arm of the T extends through the transverse dimension of the block in the opposite direction to facilitate engagement of the first arm with said operating member, and a pair of resilient clips for mounting the block with respect to the corresponding one of the master and slave devices.

Because of the flat structure of the constituent members of the force-transmitting mechanism apertures or notches can be easily provided at the end portion thereof and thus coupling to the connectors is made easier than a cylindrical structure which would require auxiliary coupling devices. Furthermore, because of the resilience of the clips, the connectors can be pushed into position quickly with respect to one of the master and slave devices.

BRIEF DESCRIPTION OF THE DRAWINGS

These and other objects, features and advantages of the present invention will be understood from the following description taken in conjunction with the accompanying drawings, in which:

FIG. 5 is a perspective view of a third embodiment of a mechanism according to the invention with the inner member shown displaced from the outer member for clarity;

FIG. 6 is a cross-sectional view taken across the plane VI of FIG. 5;

FIG. 7 is a cross-sectional view taken along a section lines VII—VII of FIG. 6;

DESCRIPTION OF THE PREFERRED EMBODIMENT

Figure 1:
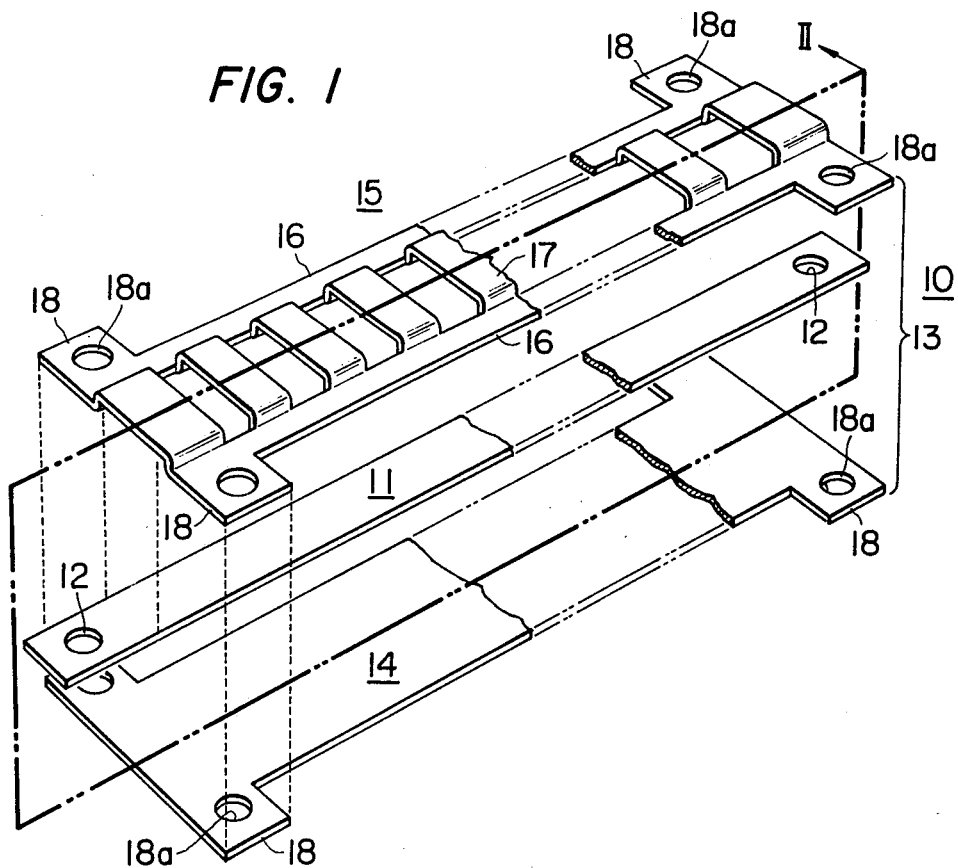
FIG. 1 is an exploded perspective view of a first embodiment of a force transmission mechanism in accordance with the invention.
Figure 2:
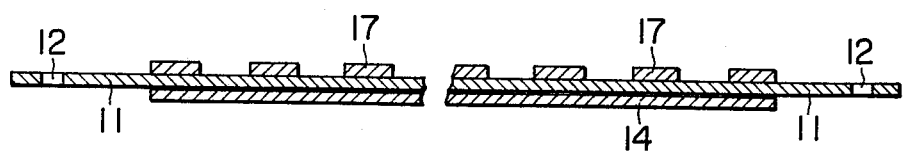
FIG. 2 is a cross-sectional view taken across a plane II of FIG. 1.

Referring now to FIGS. 1 and 2 of the drawings in which the force-transmitting mechanism of the present invention is shown generally at 10 and comprises an inner flexible metal or hard plastic thin strip 11 having at each end a hole 12 and an outer sheath 13 comprising a side member or thin strip 14 of the same material as, and greater in width, but smaller in length than, the inner member 11 and a second side member of a ladder-like strip 15 of the same material as strip 14. The thickness of the members 11, 14 and 15 is very small in comparison with their respective lengths to provide sufficient pliability to bending. The strip 15 comprises a pair of parallel sidepieces 16 interconnected at short intervals by longitudinally spaced crosspieces 17, and may be fabricated integrally from a single strip of steel by punching out a plurality of longitudinally spaced apertures and pressing the non-punched portions by the thickness of the inner member 11 to form bridge-like crosspieces 17. The sidepieces 16 of strip 15 and the companion strip 14 are welded together to define a space which extends along the length of the mechanism 10 to slidably accommodate the inner member 11. Therefore, in the outer member 15 a pair of elongate flanges are formed in parallel to opposite edges of the central elongate portion of the same width as that of the inner member 11, the central portion being formed by the crosspieces 17 and part of the member 14. Both of the members 14 and 15 have the same dimensions and are provided at each end a pair of transverse extensions 18 with a hole 18a therein.

The inner strip 11, when accommodated within the outer sheath 13, extends from the opposite ends of the outer sheath as shown in FIG. 2 to allow the inner strip 11 to move longitudinally relative to the outer member. Because of the ladder-like structure, the strip 15 will bend with sufficient pliability to a bending stress and adds a considerable degree of flexibility to the cable 10. Further, because of the thinness of the members 11, 14 and 15 in comparison with their respective lengths, there is no substantial difference between the contraction of the inner side of one of contacting members and the expansion of the outer side of the other contacting members when the cable 10 is curved under bending stress.

Figure 3:
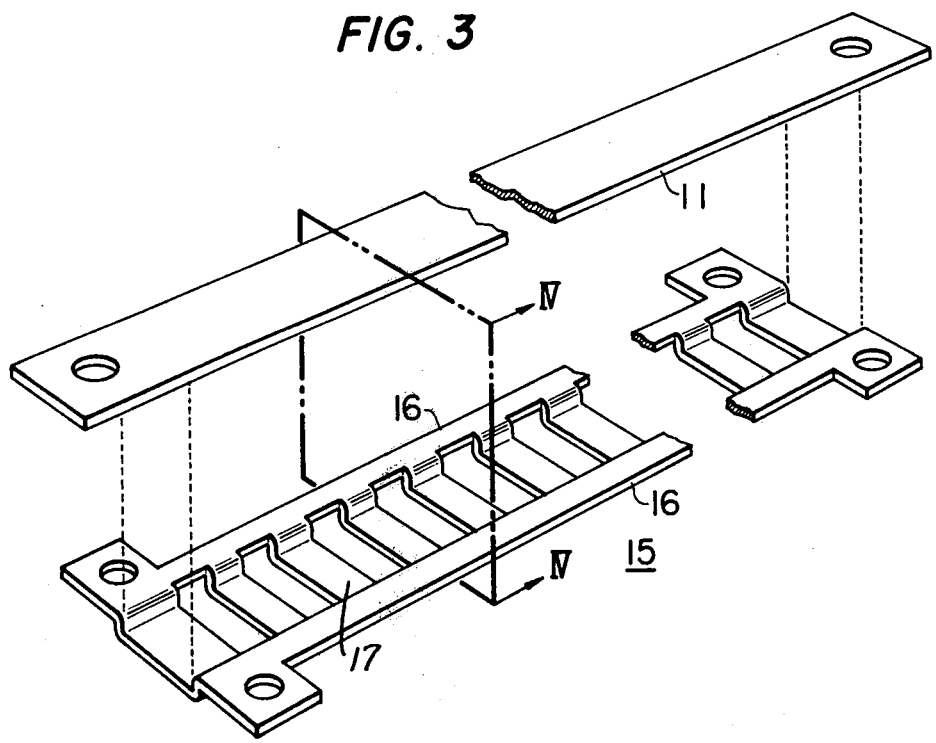
FIG. 3 is an exploded perspective view of a second embodiment of a mechanism in accordance with the invention.
Figure 4:
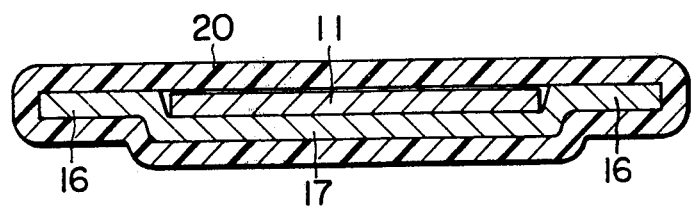
FIG. 4 is a cros-sectional view taken across a plane IV of FIG. 3.

FIGS. 3 and 4 show a modified embodiment of the present invention. In FIG. 3 the same ladder-like member 15 is employed as in the previous embodiment in connection with FIG. 1 to define a longitudinal guide groove with the opposed edges of the sidepieces 16 and the crosspieces 17. The inner force-transmitting member 11 is disposed in the guide groove of member 15 flush with the sidepieces 16. These two members are enclosed by a thin coating 20 of thermally shrinkable plastics material as illustrated in FIG. 4. In this illustrative structure, the side of the coating 20 which is in contact with the inner member 11 serves a guide wall for the inner member because of its flat surface against the surface of the inner member 11 and the sidepieces 16. The provide smooth longitudinal movements, the inner member 11 is constructed of metal, preferably springy steel. Because of the shrinkage, the coating material does not fill the spaces between adjacent crosspieces 17 completely to adversely affect the flexibility of the ladder-like strip 15. The coating 20 not only serves as a guide for the inner member, but improves the appearance of the mechanism 10.

The mechanism shown in FIGS. 5 and 6 is a preferred embodiment of the present invention in which the guide member 13 comprises a series of longitudinally spaced transverse sections 31 which overlie one side surface of the transmitting member 11 and a series of identical sections 32 which overlie the opposite side surface of the transmitting member 11 and a pair of longitudinally extending thin strip members 30 to which the transverse sections 31 and 32 are rigidly connected. The sections 31 are staggered relative to the sections 32 so that the outer guide 13 can be manufactured from a single sheet of metal by a conventional punching and stamping process. As shown in FIG. 7, the transmitting member 11 and the side members 30 of the outer guide 13 have equal thickness and are disposed on the same plane.

Because of this structure, the transmitting member 11 and the side members 30 will have the same radius of curvature when bent by an external force so that under any curved configuration the relative movement of the transmitting member to the guide member will have the same amount of stroke at both ends of the mechanism. The sheath guide 13 with the inner strip 11 disposed therein, is enclosed by a coating 34 of thermally shrinkable plastics material. This not only improves the appearance of the mechanism but protects it from damage arising in handling (FIG. 7).

Figure 8:
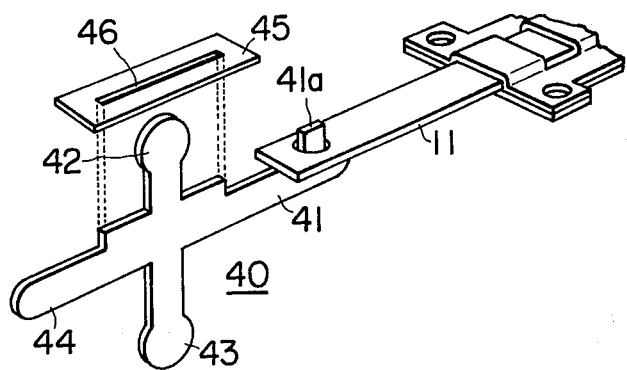
FIG. 8 is a perspective view of a guide follower of the connector of the invention with one end of the inner member of the mechanism of FIG. 1 shown coupled thereto.
Figure 9:
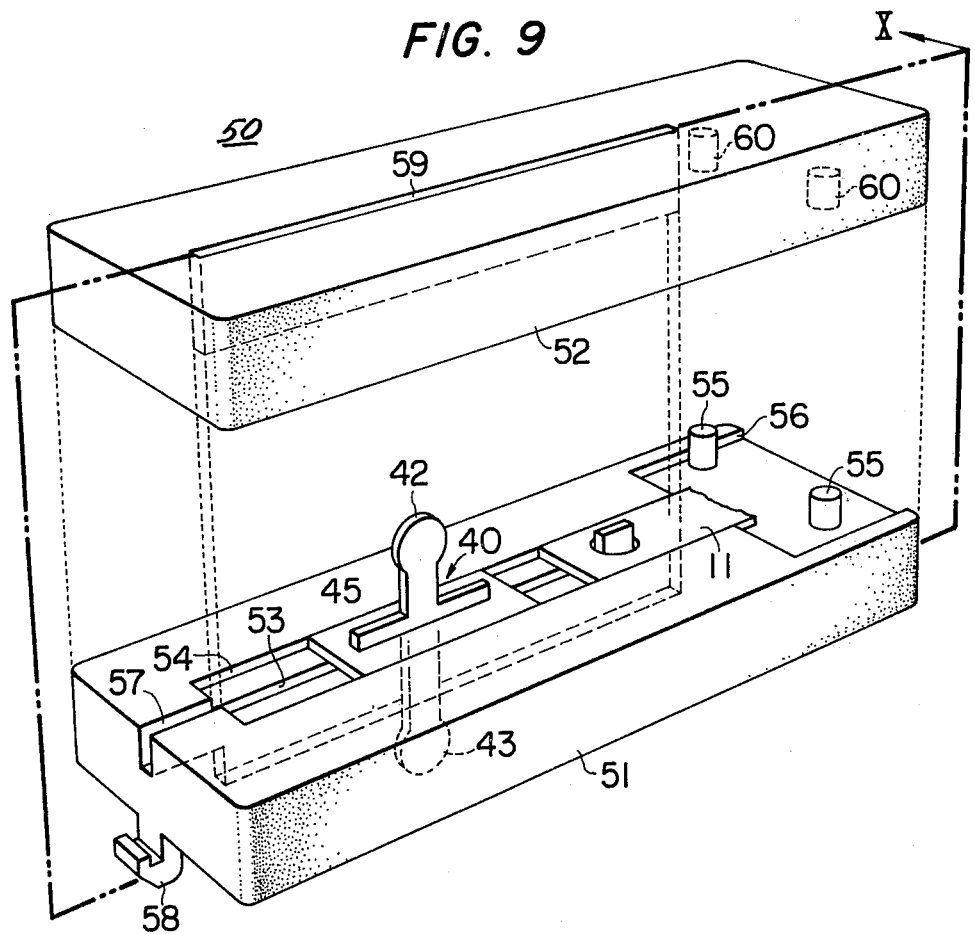
FIG. 9 is an exploded perspective view of a connector in accordance with the invention with the guide follower being seated in a guide slot.
Figure 10:
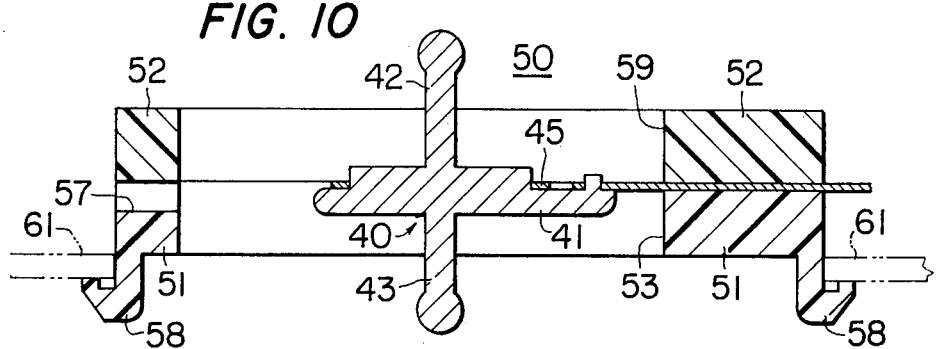
FIG. 10 is a cross-sectional view across the plane X of FIG. 9.

At each end of the force-transmitting mechanism 10, there is provided a connector 50 as illustrated in FIG. 9. The connector 50 is made up of identical moulded plastic parallel-piped bodies 51 and 52. The body 51 is formed with a guide slot 53 which extends lengthwise of the body 51 and aligned with a similar slot 59 formed in the body 52. In the aligned slots 53, 59 is slidably disposed a guide follower 40 of generally T-shaped structure as shown in FIG. 8 with a longitudinal arm 41 connected with an end of the transmitting member 11 by engaging projection 41a with the hole 12 of the member 11. A strip 45 having a slit 46 is snapped into the central raised portion of the guide follower 40 and held in position as by depressing the ends of the raised portions in order to serve as a guide flange. The guide block 51 is formed with a recess 54 from its upper surface and a slot 57, to receive the flange 45 of guide follower 40 and permit the guide follower 40 to extend its arm 44 through the slot 57. The transverse arm 43 of the guide follower 40 extends through the guide slot 53 and projects from the bottom plane of the block 51 as clearly seen in FIG. 10. Block 51 is further provided with a pair of lugs 55 with which the holes 18a of the outer member 13 are engaged so that the stationary guide block 51 and the outer member 13 are connected to member 11 and guide follower 40. A depression 54 opens into a wider depression 56 adjacent the lugs 55 to accommodate the end of the outer member 13. At each lower edge of the block 51 is provided a resilient U-shaped clip 58 which provides gripping engagement with the edge of an equipment surface on which the block 51 is to be mounted as will be described hereinbelow. Block 52 is formed with a slot 59 along its length and a pair of holes 60 which engages the lugs 55 of block 51 so that the slot 59 is brought into alignment with the slot 53 of the block 51. The slot 59 extends across the transverse dimension of the block 52 to allow the upper end of arm 42 of guide follower 40 to project from the upper face of the block 52. Blocks 51 and 52 are secured together by adhesive. FIG. 10 illustrates the block 50 in cross-section mounted on a surface 61 shown in chain dotted lines with clips 58 engaged with the edges of the surface 61.

The force-transmitting mechanism 10 of the present invention with the connector 50 connected with each end of the mechanism 10, can be fitted as a transmission device between a master control device located at an accessible place and a slave controlled device located at an inaccessible place for remote control purposes. In such an arrangement the block 50 serves as a connector between each end of the mechanism and the operating member of one of master and slave devices, and the mechanism 10 transmits force from the master to slave devices. The master control device may be any of an actuator for translating power into reciprocating movements. The slave controlled device may be a mechanically controlled electrical circuit device or element such as variable resistors, variable capacitors, variable inductors, and switching circuits.

Figure 11:
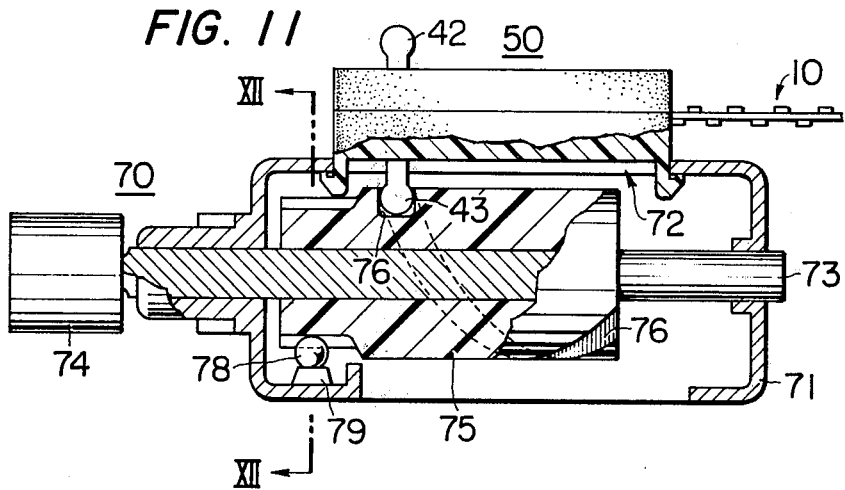
FIGS. 11 to 15 show examples of master control devices shown operatively connected with the connectors of FIG. 9 in chain dotted lines for simplicity.
Figure 12:
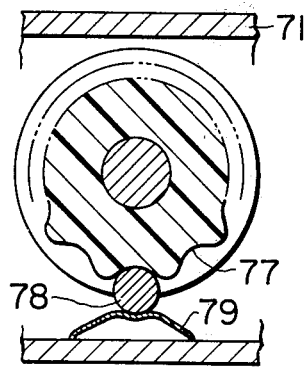

FIGS. 11 to 15 illustrate examples of the master control device. In FIG. 11, the connector 50 is shown mounted on a surface of a master control device or actuator 70 which comprises a metal housing 71 with a hole 72 on top of the housing for mounting the connector 50. A control shaft 73 is rotatably mounted on the side walls of the housing with one end projecting from the front end of the housing to mount a control knob 74. Within the housing 71 a cylindrical body 75 of plastics material formed with a helical groove 76 around its periphery, is mounted on the shaft 73 for unitary rotation therewith. The cylindrical body 75 is also formed with a plurality of indentations 77 on the front edge, and held in position by a ball 78 which is biased toward the center axis of the shaft by means of a leaf spring 79, so that the control shaft takes one of a plurality of positions with the ball engaging a selected one of the indentations 77. In the helical groove 76 of body 75 is received the arm 43 of connector 50. The insertion of the arm 43 to the groove 76 is effected by using the opposite arm 42 as a means for positioning it for alignment with the groove 76. By rotation of control knob 74, the point of engagement between the groove 76 and arm 43 moves longitudinally through the guide slots of connector 50 and this movement is transmitted by the cable 10 to a slave device at the opposite end.

Figure 16:
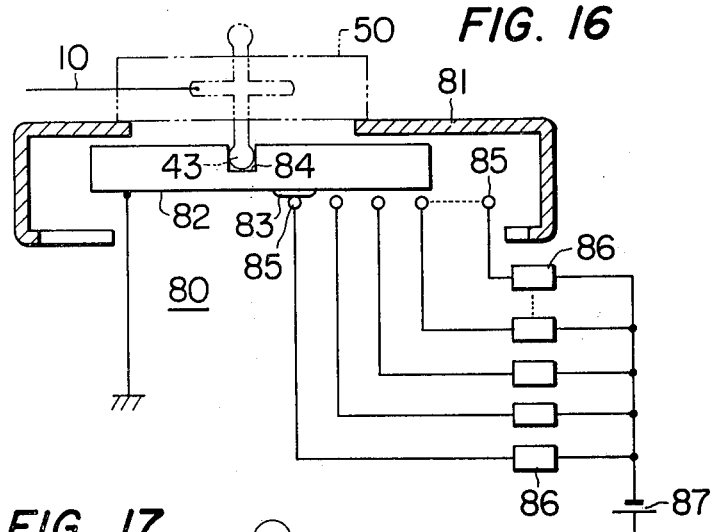
FIG. 16 is a switching circuit as an example of slave controlled devices.

An example of the slave device which receives the longitudinal motions transmitted, is shown in FIG. 16. The connector 50 coupled to the opposite end of the cable 10 is mounted on the housing 81 of a switching device 80 which includes an elongated guide member 82 having an electrical contactor 83 and a recess 84 therein. The guide member 82 is slidably mounted within the housing. The arm 43 of connector 50 extends into the housing to engage the recess 84 of guide member 82. A plurality of switch contacts 85 is arranged along the length of the guide 82 in proximity to the contactor 83. The contactor 83 is connected to ground directly or by way of the member 82 if it is made of a conducting material.

The received longitudinal motions cause the guide 82 to move longitudinally in step with the change in position of the control shaft 73 of master control device 70 to change the position of the contactor 83 in relation to the switch contacts 85. Switch contacts 85 are connected to respective circuits 86 to complete a circuit for one of them through power source 87 to ground when brought in contact with the contactor 83.

Figure 13:
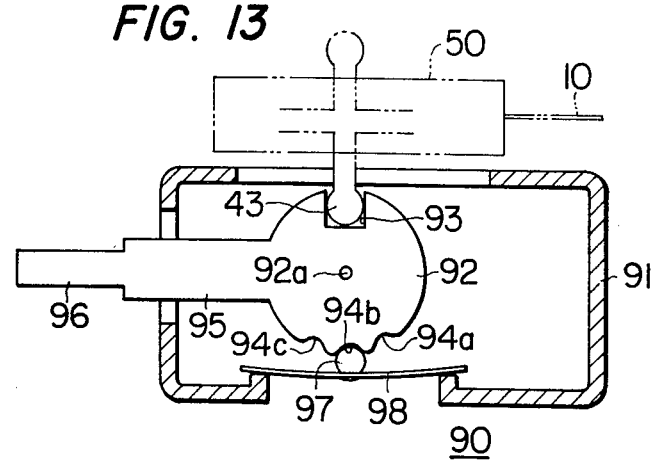

A three-position switch 90 is shown in FIG. 13 to serve as a master control device. Switch 90 includes a disc 92 formed with a recess 93 and three indentations 94a to 94c and an extension arm 95 connected with a control lever 96. The disc 92 is pivoted at 92a by the side walls of the housing with its extension 95 projecting through a hole in the front end of the housing. A ball 97 is biased toward the pivot 92a by a leaf spring 98 disposed on the bottom wall of the housing. The connector 50 shown in chain dotted lines for simplicity is mounted on the top wall of the housing 91 in a manner as described hereinbefore, with the arm 43 engaged with the recess 93. The movement of lever 96 about the pivot 92a causes the disc 92 to take one of the three discrete positions and the arm 43 moves accordingly between three different positions. The mechanism 10 transmits this movement to the slave device 80 of FIG. 16 in which only three of the contacts 85 are needed.

Figure 14:
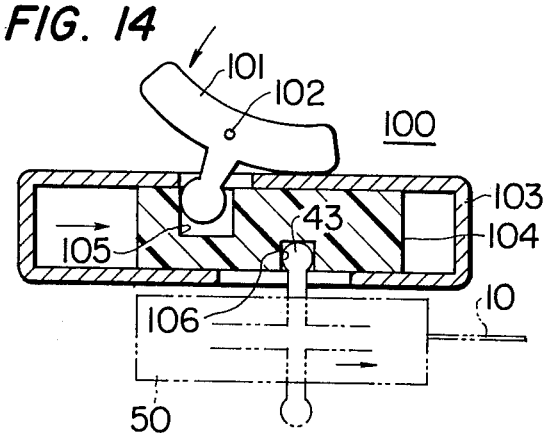
Figure 15:
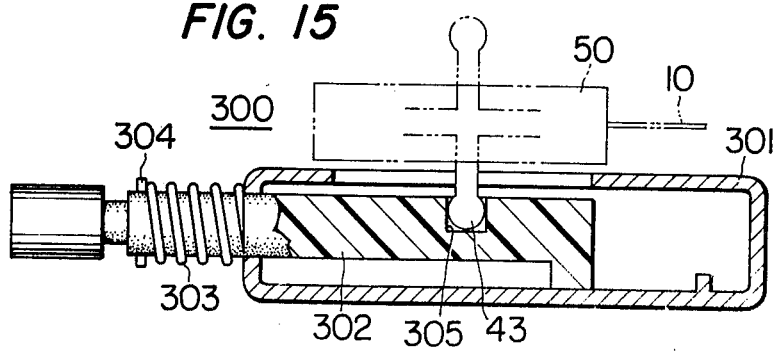

A toggle switch 100 as shown in FIG. 14 can also be used in conjunction with the slave device 80 in which only two of the contacts are necessary. A T-shaped member 101 is pivoted as at 102 and biased in such manner to take up one of two positions. In one position one arm of the T rests on the upper surface of the housing 103 and in the other position the other arm of the T rests on that surface. The switch 100 further includes a guide member 104 formed with recesses 105 and 106. The leg of the T is received in the recess 105. The connector 50 is mounted on the lower surface of the housing 103 with its arm 43 received in the recess 106. By pivotal movement of the T-shaped member 101, guide member 104 slides longitudinally on the bottom surface of the housing to thereby causing the connector arm 43 to move accordingly.

Figure 17:
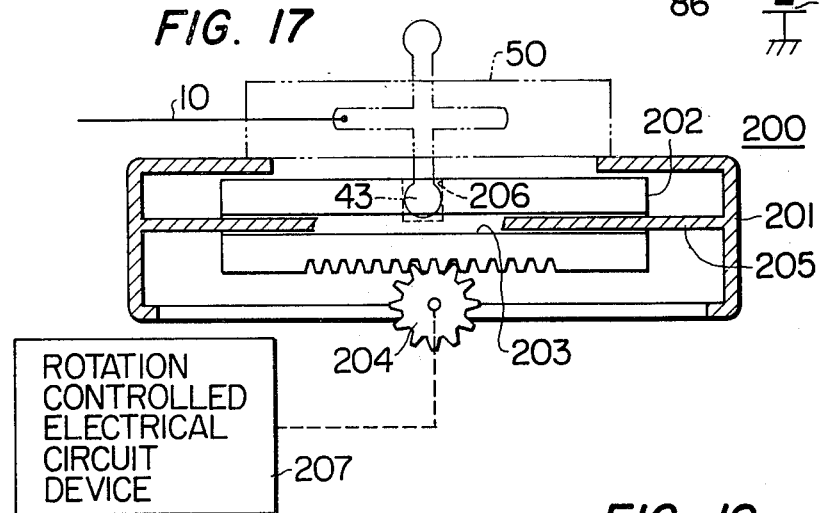
FIG. 17 is another example of the slave controlled devices in which the transmitted longitudinal motions are converted into reversing rotations to control a rotation-controlled electrical circuit device.

In order to actuate rotatably controlled electrical circuit devices including variable resistors, variable capacitors and variable inductors, means are provided for the slave for translating longitudinal motions into reversing rotations, while the master device effects a smooth rotary movement. The master device 70 of FIG. 11 is utilized for this purpose by removing the ball 78 from the housing 71. With the ball 78 being removed, the shaft 73 is caused to rotate continuously instead of stepping movements and the connector arm 43 moves continuously along its path. This continuous longitudinal movement is transmitted by cable 10 to the connector 50 at the opposite end mounted on a housing 201 of a transistor 200 shown in FIG. 17. The translator 200 comprises a rack 202 formed with a pair of guide slots 203 (only one is shown) and a pinion gear 204 rotatably mounted on the side walls of the housing 201 in meshing engagement with the teeth of rack 202. The housing 201 is provided with a pair of guide flanges 205 on the side walls thereof received in the respective guide slots 203 of guide 202. The guide member 202 is formed with a recess 206 in which the connector arm 43 is received. The longitudinal motions transmitted from the master device 70 causes the pinion 204 to rotate about its axis. A rotation-controlled electrical circuit device 207 has its operating rotor shaft connected to the axis of the pinion 204 for unitary rotation therewith.

As a master control device, a spring-loaded, nonlocking type push rod mechanism (FIG. 15) may also be employed for actuating the switching device of FIG. 16. The push rod mechanism 300 includes a housing 301 which carries on its upper surface the connector 50 shown schematically in chain dotted lines and a cylindrical push rod 302 slidably disposed within the housing. A compression spring 303 is provided surrounding the shaft 302 between the front end of the housing 301 and a stop 304 on shaft 302 to urge the rod toward the front. A recess 305 is provided in the rod 302 to receive the connector arm 43. As long as the rod is pushed, the slave device is held in the actuating position.

With a connector 50 at each end, the mechanism 10 of the present invention can be fitted between the master and slave devices at different locations. Because of the resilience of the clips 58, the connector 50 can be simply mounted by a single operation. This is particularly advantageous in electrical wiring operations, as the mechanically controlled electrical circuit devices can be wired separately from other connecting devices to the associated circuitry on a printed circuit board and then the circuit board as a whole may be dipped in a solder well for solder connection. The master control device can be separately installed on a convenient place accessible to the user and the connector 50 at each end of the cable 10 is snapped into position with respect to the associated device by resilient clips 58 are hereinbefore described. The cable and connector arrangement as an integral unit is thus mounted after the master and slave devices have been installed, and thus facilitates wiring involved in the installation of slave devices and mounting of the master devices.

Figure 18:
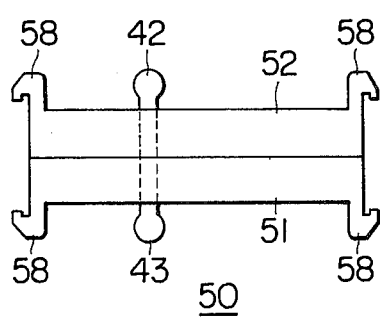
FIG. 18 is a modification of the connector of FIG. 9.

To further facilitate the mounting of connector 50, the block 52 is provided with a pair of resilient clips 58 as fitted on the block 51, as illustrated in FIG. 18. This provides symmetrical construction which can prevented the twisting of cable 10 in case where the contacting surface of one of the master and slave devices is reversed to the other.

Figure 19:
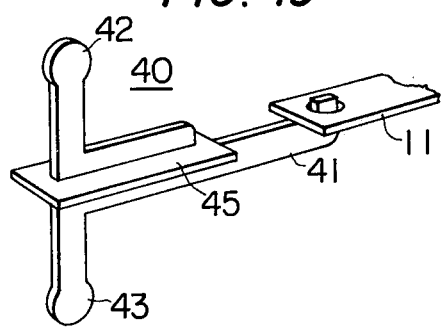
FIG. 19 is a modification of the guide follower of FIG. 8.

The guide follower 40 is described in connection with FIG. 9 can be modified as shown in FIG. 19 in which the guide follwer is T-shaped rather than cross-shaped, with the leg 41 serving as a main element of the guide follower to provide longitudinal motions. Either of arms 42 and 43 engages the operating member of a master (slave) device, the other arm serving as an aid in engaging the opposite arm with the operating member.

What is claimed is:

1. Apparatus for controlling an electrical characteristic from a remote location, comprising:

a master control device having a manually operating member operable to variable positions in response to an external force applied thereto;

an electrical circuit device having a mechanical operating member permitting the same to provide a variable electrical characteristic in response to variable positioning of said master control device;

a force-transmitting mechanism comprising an elongated, planar, force-transmitting member, longitudinally spaced sections, extending transversely of said force-transmitting member and overlying different sides of the same, and a pair of longitudinally extending planar guide members having portions connecting said spaced sections and to which said sections are rigidly connected, said force-transmitting member and said guide members having an equal thickness and disposed on a same plane, said guide members cooperating with said transverse sections to retain said force-transmitting member against lateral escape;

a first connector connected at one end of said force-transmitting mechanism, comprising a first block formed with a first guide slot and connected with one end of said guide members of said force-transmitting mechanism and including first means for nonoperatively connected said block with said master control device, and a first guide follower slidably received in said slot and connected with one end of said force-transmitting member of said mechanism and operatively connected with the operating member of said master control device so that the guide follower is slidable in said slot in response to the operation of said master control device;

a second connector connected at the opposite end of said force-transmitting mechanism, comprising a second block having a second guide slot and connected with the opposite end of said guide members of said mechanism and including second means for nonoperatively connected said second block with said electrical circuit device, and a second guide follower slidably received in said second slot and connected with the opposite end of said force-transmitting member and operatively connected with the operating member of said electrical circuit device so that the second guide follower is slidable in response to the movement of the first guide follower.

2. Apparatus as claimed in claim 1, wherein said manually operating member of said master control device comprises a recess, and said first guide follower comprises a first longitudinal member connected with said one end of said force-transmitting member and a first transverse member extending through said first guide slot to engage the recess of said manually operating member.

3. Apparatus as claimed in claim 1, wherein said mechanically operating member of said electrical circuit device comprises a recess, and said second guide follower comprises a second longitudinal member connected with the opposite end of said force-transmitting member and a second transverse member extending through said second guide slot to engage the recess of said mechanically operating member.

4. Apparatus as claimed in claim 1, wherein each of said first and second blocks is formed of moulded plastic of parallelpiped construction.

5. Apparatus as claimed in claim 4, wherein each of said parallelpiped blocks is formed by first and second sections each having an aligned slot for receiving said guide follower.

6. Apparatus as claimed in claim 1, wherein each of said guide members of said mechanism is provided with a hole at each end of the member and said force-transmitting member is provided with a hole at each end thereof, and therein the respective one of said guide followers includes a projection engaged with the hole of said force-transmitting member and the respective one of said blocks includes a pair of projections engaged with the respective holes of said guide members.

7. Apparatus as claimed in claim 1, wherein said longitudinally spaced sections of said force-transmitting mechanism include a first group of crosspieces in a first plane and a second group of crosspieces on a second plane parallel to the first plane, and the crosspieces of said first group being arranged in a staggered relationship to the crosspieces of the second group.

* * * * *